United States Patent
James, III

(10) Patent No.: US 9,202,166 B2
(45) Date of Patent: Dec. 1, 2015

(54) METHOD AND SYSTEM FOR KANBAN CELL NEURON NETWORK

(71) Applicant: Colin James, III, Colorado Springs, CO (US)

(72) Inventor: Colin James, III, Colorado Springs, CO (US)

(\*) Notice: Subject to any disclaimer, the term of this patent is extended or adjusted under 35 U.S.C. 154(b) by 306 days.

(21) Appl. No.: 13/850,015

(22) Filed: Mar. 25, 2013

(65) Prior Publication Data

US 2014/0136459 A1    May 15, 2014

Related U.S. Application Data

(60) Provisional application No. 61/724,622, filed on Nov. 9, 2012.

(51) Int. Cl.
*G06N 3/04* (2006.01)

(52) U.S. Cl.
CPC ........................................ *G06N 3/04* (2013.01)

(58) Field of Classification Search
None
See application file for complete search history.

(56) References Cited

U.S. PATENT DOCUMENTS 4,992,680 A * 2/1991 Benedetti ............ H03K 19/1735
326/39
2008/0260145 A1 10/2008 Trichina

OTHER PUBLICATIONS

James III, "A Reusable Database Engine for Accounting Arithmetic,"Proceedings of the Third Biennial World Conference on Integrated Design and Process Technology—vol. 2, 1998, pp. 25-30.
James III, "Proof of Four Valued Bit Code (4vbc) as a Group, Ring, and Module," Presented at World Congress and School on Universal Logic III, 2010, 3 pages.
James III, "Recent Advances in Logic Tables for Reusable Database Engines," American Society of Mechanical Engineers Petroleum Division, Energy Sources Technology Conference & Exhibition, 1999, 12 pages.

* cited by examiner

*Primary Examiner* — Wilbert L Starks
(74) *Attorney, Agent, or Firm* — Aspire IP; Yiu F. Au

(57) ABSTRACT

A system for machine cognition includes Kanban cells (KC), Kanban cell neurons (KCN), and Kanban cell neuron networks (KCNN). The KC is an asynchronous AND-OR gate without feedback that is self-timing by the input data to process until input is equal to output. Input is a four-valued logic (4VL) based on the set {contradiction, true, false, tautology} of four-valued bit code (4vbc) where contradiction is equivalent to null. Access to a sparsely filled look up table (LUT) is minimized in hardware with a 2-bit value per logical signal.

18 Claims, 12 Drawing Sheets

METHOD AND SYSTEM FOR KANBAN CELL NEURON NETWORK

CROSS REFERENCE TO RELATED APPLICATION

The present application claims the benefits of and priority, under 35 U.S.C. §119(e), to U.S. Provisional Application Ser. No. 61/724,622, filed Nov. 9, 2012, entitled "METHOD AND SYSTEM FOR KANBAN CELL NEURON NETWORK." The aforementioned document is incorporated herein by this reference in its entirety for all that it teaches and for all purposes.

BACKGROUND OF THE INVENTION

1. Field of the Invention

The present invention generally relates to the framework for machine cognition, and more particularly to a method and system for signal processing of combinatorial logic in a network.

2. Discussion of the Background

Originally the Kanban cell (KC) was the production part of a linear pull system used to minimize the size, change, and turnover of parts inventory for the Just in Time (JIT) manufacturing of automobiles.

FIG. 1 shows the KC in the Petri net, a bipartite directed graph, and with or without a failure or idle subnet as an abstraction of the generalized stochastic Petri net (GSPN) of flexible manufacturing systems (FMS), which are push production systems (for example, using pallets to load incomplete parts and to unload completed parts by continuous transportation as by conveyer or automatic guided vehicle (AGV)).

In FIG. 1, system 10 is a Petri net of a Kanban cell (KC) disclosed in Colin James III, *Recent Advances in Logic Tables for Reusable Database Engines*, Proceedings of the American Society of Mechanical Engineers International, Petroleum Division, Energy Sources Technology Conference & Exhibition, Houston, Tex., ETCE99-6628, 1999 ("James 1999"), herein incorporated by reference in its entirety for all purposes. Step 104 is a transition. Step 101 is the input and output place. Steps 105 and 106 are feedback paths of the feedback loops of the paths 103 to 104 and 102 to 104. In this context, feedback paths serve as decision branches in the logic of the KC, and are commonly referred to in their totality as feedback loops. (Steps marked as m1, m2, m6, and t2 are true to the original labels and equivalent to the respective Steps 101, 102, 103, and 104.)

FIG. 2 shows similarity between the structure of the KC and the design of a universal accounting arithmetic system in N-dimensions, disclosed in James 1999 and Colin James III, *A Reusable Database Engine for Accounting Arithmetic*, Proceedings of the Third Biennial World Conference on Integrated Design & Process Technology, Vol. 2, p. 25-30, Berlin, Germany, 1998 ("James 1998"), herein incorporated by reference in its entirety for all purposes. Steps 201, 202, and 203 are descriptive of the respective symbols of Steps 101, 102, and 103 in FIG. 1. Steps 204, 205, and 206 are descriptive of the respective symbol of Step 104 in FIG. 1. Step 207 is keyed to the respective Step 107 in FIG. 1. Steps in FIG. 2 describe how a KC system performs the identical functionality of a disparate system, heretofore not related solely to the field of manufacturing, and hence indicate that the KC is a universal mechanism for abstract processing of any kind.

In FIG. 2, system 20 is an accounting arithmetic system disclosed in James 1998. Step 201 inputs a transaction type and the amount on which to operate. Step 202 uses a look up table (LUT) to translate the transaction type into an output index code. Step 203 uses another LUT to obtain the series of sequential logic switches by which to operate on the amount from Step 201. The input index of Step 203 is the output index of Step 202. Step 204 is the output of the account indexes and respective operators. The input index of Step 204 is the output from Step 203. Step 205 operates the series of sequential accounts by which the respective operators process the amount from Step 201. The accounts contain only a single balance value which is updated and overwritten. Step 206 is the update step by which an unbounded transaction log records the transaction type and amount from Step 201 and also a unique time stamp that verifies when Steps 201 through Step 205 are completed. Step 207 is a feedback loop from Steps 206 to Step 201 to restart the process for further inputs.

FIG. 3 shows a synchronous, self-timing neural network as a series of feedback loops.

In FIG. 3, system 30 is a neural network. System 30 consists of data places, through which data flows as data places 301, 311, and 321, and of timing places as timing places 302, 312, and 322, which stimulate the data places as 301, 311, and 321. The direction the data flows is bidirectional as in paths 305 and 306. The direction of timing paths is bidirectional as in paths 303 and 304. The timing places 302, 312, and 322 effectively open and close the data places 301, 311, and 321 to control when waiting data is allowed to flow. The timing places 302, 312, and 322 may be either physical clock cycles or logical looping structures, the duration for which constitutes a delay in system 30.

In biology, a neuron is a cell nucleus and body with multiple dendrites as input paths, and a single axon as output path. The entry pathway of the dendrite to the neuron cell is a synapse and receptor where in the neurotransmitter fluid such as serotonin, ion transfers occur with calcium (Ca+), potassium (K+), and sodium (Na+).

Neural components can be represented as vector spaces such as an adaptive linear neuron or adaptive linear element (Adaline) composed of weight and bias vectors with a summation function (OR circuit), and also a multi-layered Adaline (Madaline) where two such units emulate a logical XOR function (exclusive OR circuit). Such components are examples of probabilistic methodology applied as an apparatus to map and mimic the biological neuron.

A "perceptron" can be represented as a binary classifier using a dot product to convert a real-valued vector to a single binary value which serves as a probabilistic methodology and apparatus to map and mimic the biological neuron.

A "spike neuron" or "spiking neuron" can be represented as a conductive network based on temporal or time bias and differential equations or calculus which serves as a probabilistic methodology and apparatus to map and mimic the biological neuron.

One deficiency with the neural network in the related art is that as it is based on a vector space, a solution is ultimately not bivalent, is probabilistic, and hence is undecidable. (That bivalency is not a vector space is disclosed in Colin James III, *Proof of Four Valued Bit Code (4 vbc) as a Group, Ring, and Module*, World Congress and School on Universal Logic III, Estoril, Portugal, 2010 ("James 2010"), herein incorporated by reference in its entirety for all purposes.)

Another deficiency is that an exclusive OR (XOR) function is sometimes mistankenly developed in a neural network to mimic a neuron. The logical XOR connective is orthogonal or effectively perpendicular as a mathematical operator. However, biological bodies are not rectilinear, but rather based on a phi or Phi ratio of $(1\pm(5^{0.5}))/2$, and meaning that there are no right angles (90-degree arcs) in biology per se. While the logical XOR connective may be constructed from the NOR or NAND logical connectives, there is no evidence that the XOR function is built into the neuron, or necessarily should be.

Yet another deficiency with the related art is that the perceptron and spike neuron can accept any input without discrimination.

SUMMARY OF THE INVENTION

Therefore, there is a need for a method and system for the Kanban cell neuron (KCN) in Kanban cell neuron networks (KCNN): to address the above KC and other problems, so as to map the neuron into a circuit, to provide a plurality of such circuits as a network; process data more quickly than the ion transfers; and not to require the synchronous, repetitive feedback or timing paths, but rather to use the attributes of the input and output data to self-time itself internally and hence to effect faster asynchronous machine cognition of itself.

One advantage of the present invention is to provide mapping neurons into a non-vector space that is not probabilistic and hence ensures bivalency and decidability.

Another advantage of the present invention is to provide mapping neurons solely with the OR and AND logical connectives, that is, with only the atomic arithmetical operations of addition and multiplication.

Yet another advantage of the present invention is to provide a KCN that accepts input only in a multi-valued logic such as in the 2-tuple set of {"00", "01", "10", "11"}.

The above and other needs are addressed by embodiments of the present invention, which provide a system and method for KCNNs that advantageously uses bivalent multivalued logic (MVL) such as four-valued logic (4VL) of four-valued bit code (4vbc) or four-valued logic with null (4VLN) and four-valued bit code with null (4vbcn).

Accordingly, in one aspect, a Kanban cell (KC) comprises a logic gate with three input values and an output value, wherein the output value is derived by arithmetical computation using the three input values, and wherein the Kanban cell performs self-timing and terminates processing when the first of the three input values equals the output value.

In another aspect, a Kanban cell neuron (KCN) comprises a plurality of Kanban cells in sequential and/or parallel operation.

In yet another aspect, a Kanban cell neuron networking (KCNN), comprises a plurality of Kanban cell neurons in sequential and/or parallel operation.

In a further aspect, a system of Kanban logic and network, comprises an AND-OR gate with a plurality of input values and one output value, wherein the output value is derived by arithmetical computation using the multiple input values, and wherein the system performs self-timing and terminates processing based on the input and output values.

In another aspect, a method of processing logic comprises computing arithmetically an output value using three input values and terminating processing when the first of the three input values equals the output value, wherein the computing is self-timing.

Still other aspects, features, and advantages of the present invention are readily apparent from the following detailed description, simply by illustrating a number of exemplary embodiments and implementations, including the preferred mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings.

DETAILED DESCRIPTION OF THE PREFERRED EMBODIMENTS

Figure 1:
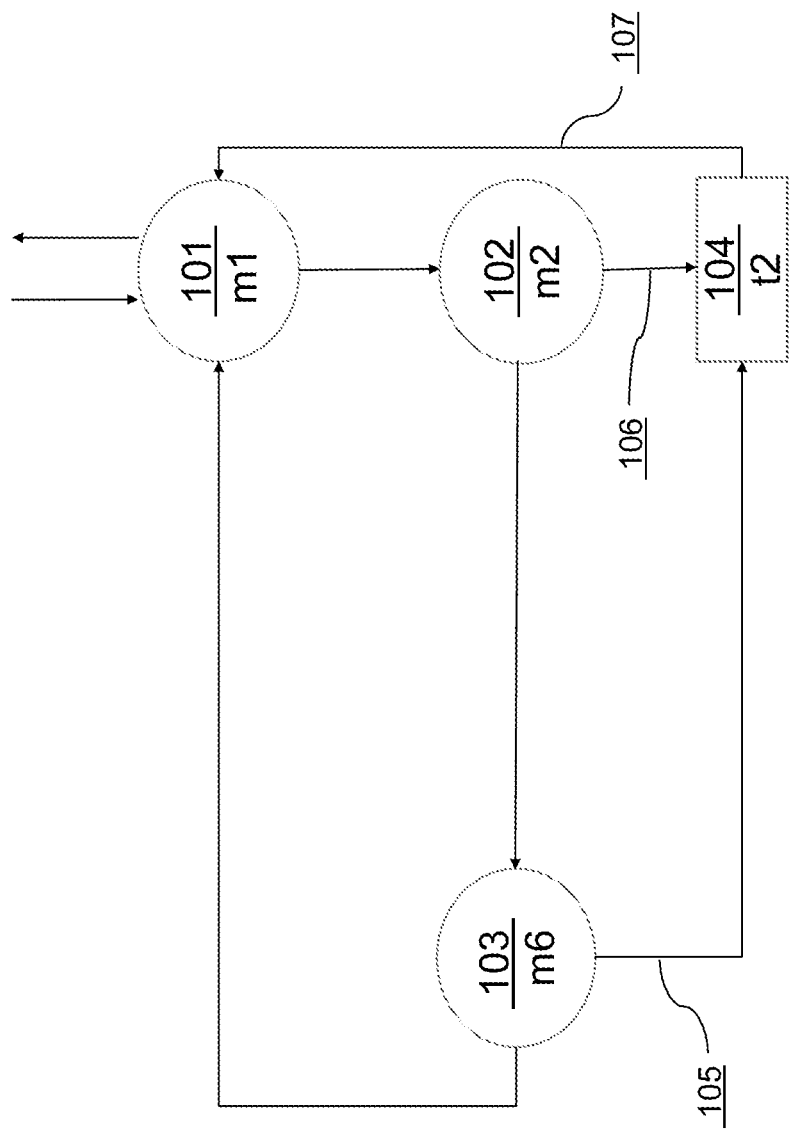
FIG. 1 illustrates a KC in the Petri net.
Figure 2:
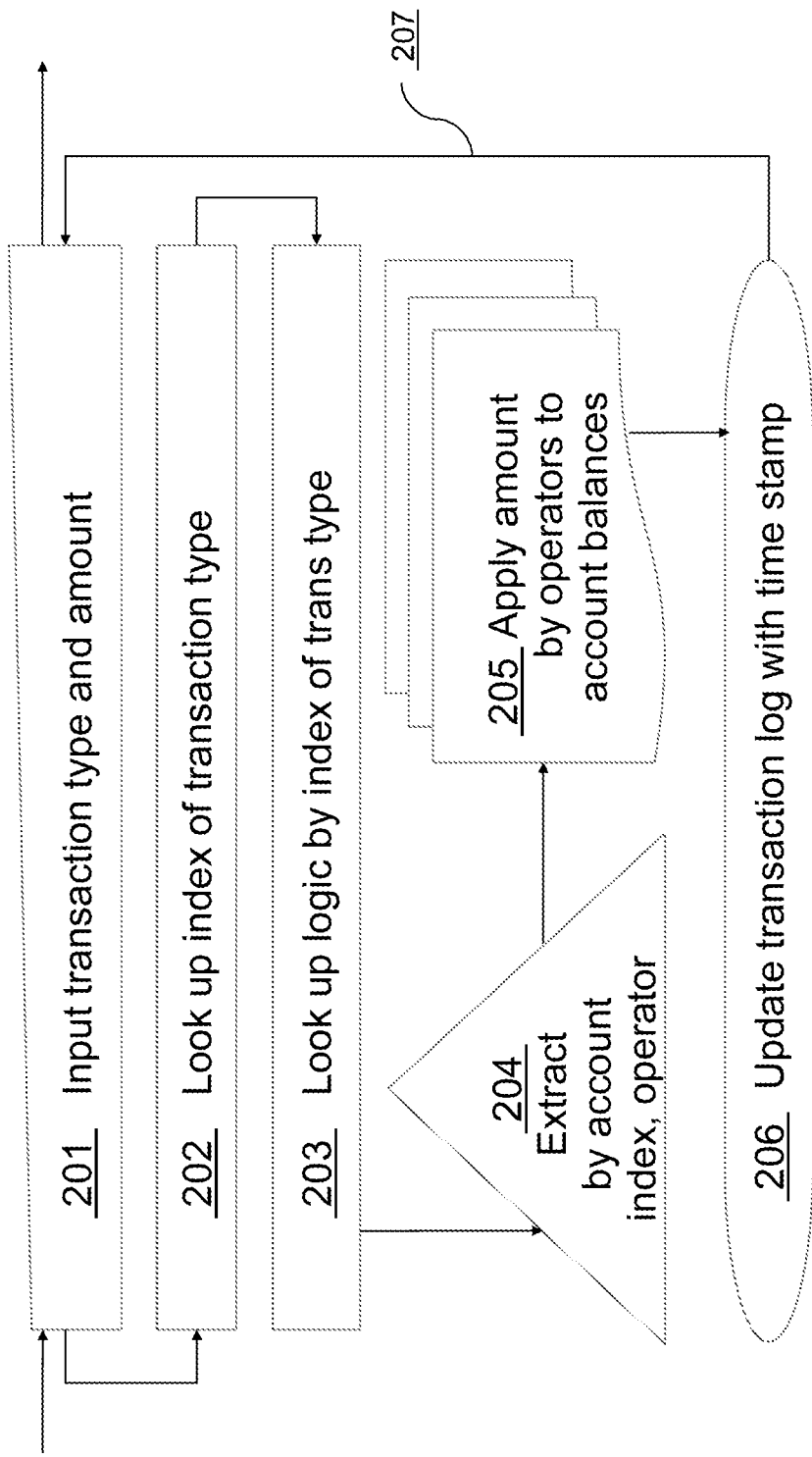
FIG. 2 illustrates an accounting arithmetic system in N-dimensions.
Figure 3:
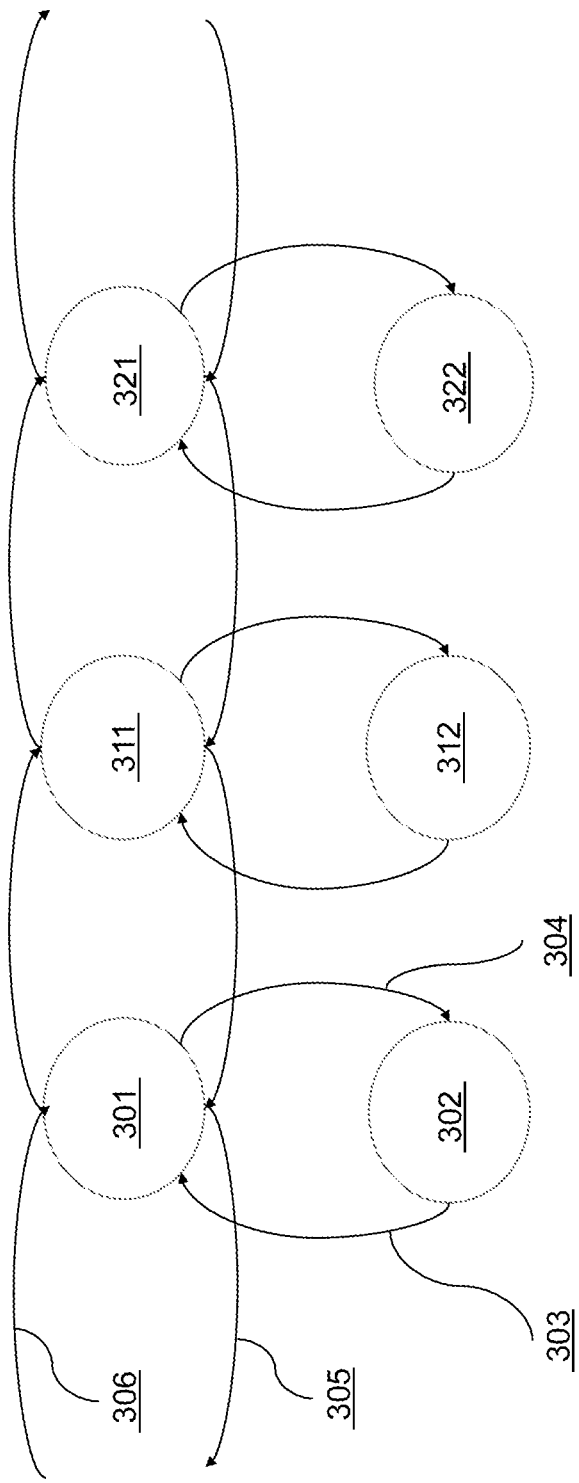
FIG. 3 illustrates a synchronous, self-timing neural network as a series of feedback loops.

An introduction to the system is disclosed here.

The system described below is a massive forest or collection of trees with branches or bundles of leaves or nodes. A node is the Kanban cell (KC). A bundle is a Kanban cell neuron (KCN). A tree is cascaded KCNs, each with a Kanban cell level (KCL). A forest is a Kanban cell neuron network (KCNN or KCN2 or $KCN^2$, and pronounced KCN-Two or KCN-Squared). The KC is effectively a sieve that processes signals in a highly selective way. The KC is the atomic and logical mechanism of the system. Three KCs make up a KCN. Hence the KCN is a radix-3 tree. Multiple KCs as nodes at the same level form a KCL to better describe the KCN to which the KCs belong. The KCNN contains nine KCNs to produce one KCN result. Hence the KCNN is also a radix-9 tree.

The KCN maps the biological mechanism of the human neuron as a series of 9-dendrites that process input signals concurrently into 1-axon, the path of the output signal. The input signals are equivalent to the logical values of null, contradiction, true, false, and tautology. These are respectively assigned as a 2-tuple of the set {" ", "00", "01", "11"} or as the set of {" ", 0, 1, 2, 3}, depending on which set of valid results is required.

As a sieve, the KCN filters three input signals into one output signal. The number of all input signals to produce one valid output signal as a result is in the ratio of about 15 to 1. The computational or machine mechanism to accomplish this is basically the same for software or hardware implementation. The core concept is that LUTs produce output results at a faster rate than by the brute force of computational arithmetic.

The theory of input signals is disclosed here.

The Kanban cell (KC) is defined as $$(ii_1 \wedge pp_1) \vee qq_1 = kk_1, \text{ where } \wedge \text{ is AND and } \vee \text{ is OR.} \qquad \text{Equation (1)}.$$

The Kanban cell neuron (KCN) is four of these connected KCs and is defined as $$((((ii \wedge pp_1) \vee qq_1 = kk_1) \wedge ((ii_2 \wedge pp_2) \vee qq_2 = kk_2))$$
$$\vee ((ii_3 \wedge pp_3) \vee qq_3) = kk_3) = kk_4. \qquad \text{Equation (2)}.$$

The utility of the KCN is that it matches the human neuron with 9-inputs as dendrites and 1-output as axon. The 9-inputs are: $ii_1$, $pp_1$, $qq_1$; $ii_2$, $pp_2$, $qq_2$; $ii_3$, $pp_3$, $qq_3$. The 1-output is: $kk_4$ This algorithm is the program for the KC.

Pseudo code is below to process input values of ii, pp, qq into kk according to one embodiment of the invention:

```
LET kk_lut = lut( ii, pp, qq)    ! 3-D LUT indexed by ii, pp, qq for
                                   kk
LET kk_output = ii               ! Preset output kk to ii if test fails
                                   below
IF kk_lut ≠ ii THEN LET kk_output = kk_lut   ! iff LUT result <> ii
```

The input to the KC is in the form of 3×2-tuples or three dibit values as effectively a 2-tuple set of {ii, pp, qq}. To produce a single dibit value as kk output, the three input values are required. Hence the expression "3-inputs to 1-output" accurately describes the KC. When KCs are chained, three inputs are required to produce each of the three outputs accepted into the next consecutive KC, for a total of 9-input signals. This defines the KCN as the expression of "9-inputs to 1-output."

The number of inputs required in $KC_1$ to produce $KC_n$ is given by the formula of $$KC_n = 3^n, \text{ where } n > 0. \qquad \text{Equation (3)}.$$

It follows that KCs in parallel and chained in succession represent a permutation of exponential complexities.

Each successively complex level of KCs hence has its number of KCs as a power of 9 (=3^2), such as (3^2)^0=1, (3^2)^1=9, (3^2)^2=81, ..., (3^2)^n.

The number of groups of signals of {ii, pp, qq} required for levels of KCs as KCLs may be tabulated. The number of groups where three groups are processed concurrently for KCL is the result of reducing the cumulative signals by a factor of three of the cumulative number of the groups of signals. For KCL-12 or 3^13, the number of discrete signals is 1,594,323, and the cumulative number of KCNs is 531,444. For sizing in hardware implementation, each such result occupies 2-bits for a respective KCL-12 storage requirement of 1,062,882 bits.

A commonly published statistic is that on average there are seven to nine dendrites per neuron. This means two to three complete groups of signals (six to nine discrete signals) could be processed concurrently at receptor points for the dendrites along a neuron.

In the formula (ii AND pp) OR qq=kk of a KC in Equation (1), there are 64-combinations of 2-tuples (or dibits) of the set of {00, 01, 10, 11}. When ii and kk are the same value (ii=kk), this represents the condition where input is processed to the same output result. This also means there was no change to the input after processing. Consequently, this event marks the termination of processing for that particular signal, and hence the result is final. Such an event or condition produces no new logical result.

When ii, pp, or qq is "00", a contradiction is present to mean something is both true and false. This has the same effect as a null value because no logical information is disclosed other than that there is a void result. Consequently the values "00" and " " are folded together into " ". Hence the four-valued logical set of values as the 2-tuple of the set {"00", "01", "10", "11"} becomes {" ", "01", "10", "11"}. This is named four-valued logic with null (4VLN) composed of four-valued bit code with null (4vbcn).

All possible combinations of the values within the 2-tuple produce 64-values. A LUT is disclosed for these values and an index in the inclusive interval range of [0, 63]. It is named LUT-64. It appears in Table 1 and in the source code below, in which the DATA statements set forth the table by rank order.

This represents a sparsely filled LUT of three inputs {ii, pp, qq} to produce one output {kk} for a KC. When three KCs are combined to make a KCN, there are nine inputs to produce one output. This is named LUT-9 and is built by combining three LUTs of 64 entries each into 64^3 entries or 262,144 entries. The sparsely filled LUT-9S is indexed as (0 ... 63, 0 ... 63, 0 ... 63).

Statistics for the percentage of signals processed from KCN-18 are disclosed. The signals accepted and rejected for the KCL-18 cascade are for input of 129,140,163 discrete random signals to a single result as a dibit (2-tuple) where 8,494.377 signals are accepted at about 7%, for a ratio of accepted signals to rejected signals of 1 to 13. This also indicates how the KCN overcomes the deficiencies of accepting all signals as in the related art described above.

Of interest is the relative distribution of the four-valued bit code (4vbc) for contradiction (00), true (01), false (10), and tautology (11). The logical results of the KCN favor the tautology (11) by about 34560/50432=69% over the other frequency of the other combined logical values. In the same way, true (01) and false (10) represent about (7936+7936)/50432=31%. These statistics imply that the KCN filters about: 2-valid assertions to 9-invalid assertions; equal numbers of true- and false-assertions; and 1-true or 1-false to 2-tautologies. By extension, this signifies that the KCN places an onus on rejecting invalid assertions and on finding tautologies. This also indicates how the KCN overcomes the problem of accepting all signals as in the related art described above.

Software implementation according to an embodiment of the invention is disclosed here.

The values in a LUT of 64-entries may be represented as the same respective values but in three different formats such as a natural number, the character string of that natural number, or character digits representing exponential powers of arbitrary radix bases. As numeric symbols, the four valid results are in the set of {0, 1, 2, 3}, and the invalid results are specified as a null set {−1}. As character string symbols, the four valid results are in the set of {"0", "1", "2", "3"}, and the invalid results are specified as a null set {" "}. As character string exponents, the four valid results are in the set of {"00", "01", "10", "11"} or {00, 01, 10, 11}.

The representation of the data elements within a LUT is important because the type of format affects the size of the LUT and the speed at which the data is manipulated. For example, to test a number for invalid result requires determining if it is a negative number, that is, is less than zero. The pseudo code for this is: IF n<0 THEN; or in the negative as IF NOT(n=0) THEN. (In logic it is often a more direct strategy to test for the negation of a proposition or an assertion.) To test a character string for an invalid result requires determining if it is a null character {" "}, that is, not within the set {"1", "2", "3"}. The pseudo code for this is: IF n$< >" " THEN; or IF NOT(n$=0) THEN. A faster method is to test the length of the character string because a null string has a length of zero. The pseudo code for this is: IF LEN(n$)=0; or IF NOT(LEN (n$)=0). The main reason it is faster to test a character string rather than a number is the fact that in this context a number is represented by 8-characters of the IEEE format rather than by one literal character. The size of the LUT is also smaller for a literal character string: 64-elements as numbers occupies 64*8=512-characters, whereas 64-elements as characters occupy 64*1=64-characters or ⅛ less.

A LUT for 9-inputs [LUT-9] consists of a 2-tuple each (2-bits) to make 9*2=18-bits. The binary number 2^18 is decimal 262,144 or those numbers in the range of the inclusive interval of [0, 262143]. This means LUT-9 is an array indexed from 0 to 262,143 that is sparsely populated with kk results as {" ", "1", "2", "3"} for binary " ", 01, 10, 11. (The null symbol means that if it is used in a multiplication or exponential calculation, the resulting number is likely to raise exceptions.) The fill rate for the sparsely populated LUT-9 also shows that a single KCN rejects about 93% of all signals, and accepts about 7%. This reiterates how the KCN overcomes the deficiencies of accepting all signals described above.

The design flow of the software implementation consists of three parts: build the LUT (as above), populate the top-tier of the KCL with input values, and process the subsequent lower-tier KCLs. For testing purposes, the input values are generated randomly in the range interval of [0, 262143], that is, at the rate of 9-input signals at once. These are checked for results (valid or invalid) and used to populate the top-tier of KCL. The size of the top-tier level is determined by the maximum memory available in the software programming environment. In the case of True BASIC®, the maximum array size is determined by the maximum natural number in the IEEE-format which is (2^32)−1. The largest radix-3 number to fit within that maximum is (3^20)−1. However, the compiler system allows two exponents less at 3^18 (3^18.5, to be exact). Hence the top-tier KCL is set as KCL-18. Subsequent lower-tier KCLs are processed by string manipulation. Consecutive blocks of 9-signal inputs are evaluated for all valid results. The valid results as single ordinal characters are multiplied to the respective exponent power of four and summed into an index value for the LUT. If the indexed LUT result is a valid result, namely not null, then the result is stored at the point in the KCL tier. This phase constitutes KCN performance.

A method of building the LUT according to an embodiment of the invention is disclosed here. A single dimensioned, 64-element array is filled with the 14-valid results as single character literals and interspersed with the 50-invalid results as null values. The array is indexed sequentially in the interval range of [0, 63] by result. Three such arrays are combined into a three dimensional array of 64*64*64=262,144 elements. This serves to index the three inputs of {ii, pp, qq} into all possible combinations of results. This array is then evaluated for null results where NOT(ii$=kk$), NOT(LEN(ii$)=0), and NOT(LEN (kk$)=0). The respective elements are then designated as invalid results. To access the three dimensional array faster, it may be rewritten in a one dimensional array. This is because while the three indexes of ii, pp, and qq are conceptually easier to digest, a single index of 262,144 elements in the range interval [0, 262143] requires only one index value. Incidental arrays used to perfect the LUT may re-indexed to zero or null to reclaim memory space. This table is named LUT-241K and is implemented in software as 2-tuples or 2-bits for 262,144*2-bits or 524,288 bits at 8-bits per byte for 64K bytes.

A LUT with a 6-character key according to an embodiment of the invention is disclosed.

The values of searchable element values for "iippqq" should also have the same key string-length, to enhance a radix search or binary search. Hence the numerical value of the index in the interval of [0, 63] is converted into a 2-character string value of the index in the interval ["00", "63"]. The subsequent indexes for the remaining two array dimensions are concatenated onto the first string index to form a 6-character key. The interval of digital search keys as [000000, 636363] contains potentially 636,364 keys. However, this is not exactly the case as some keys are impossible because the range is sparsely occupied. Excluding consecutive null values at the extrema of the range, the interval range of valid keys is [010002, 586353], but again not all key combinations therein are possible as the frequency or cycle of valid results is in runs of four separated by blocks of seven nulls. This is named LUT-636K.

The Phi-hash LUT according to an embodiment of the invention is disclosed here.

Using a 1,148,219-element Phi-hash table versus the LUT-636K with 636,364-elements above occupies about 55% more memory space and is slower to process because the character string result values must be converted back to natural integers. The Phi-hash formula uses upper case Phi= $((5^0.5)-1)/2$ and hash_m=$2^{21}-(2^n)$, where n=19.8559, and hash (key)=Floor_INT(hash_m*((Phi*key)MOD 1)). The choice of n here is best determined by a test so as to minimize the size of the hash space. In other words, the hash space is just large enough to accommodate all hash values with finding a unique index within that space.

Software performance is disclosed here. Software simulation uses pseudo code of the educator's language of True BASIC® on a no-load, quad-core laptop with 8 GB RAM. Processing a LUT of 4VLN with the "00" values folded into the null " " is about 1% faster than without combining those values. Software performance favors the LUT-241K design using radix-4 arithmetic to build index values, as listed in the source code below [0115]. This executes at the rate of 1,087, 752 KCNs per second. The rate is based on processing 21,523,361 KCNs. This number of KCNs processed is derived from the Sigma permutation of $$\sum_{i=1}^{17}(3 \wedge (i-2)).$$ Equation (4)

Hardware implementation according to an embodiment of the invention is disclosed here.

Of critical importance to implementation in hardware is the particular hardware device(s) chosen. This is based on hardware sizing. In the case of LUT-241K, the size is 262,166 elements of 2-bits each or 524,588 bits (512 Kb) or 65,336 bytes (64 KB). However, additional bits are required to represent the KCLs of the KCNNs. These are calculated as a radix-3 function where 3^12 or 531,441 entries at 2-bits each is 1,062,882 bits. The LUT and data structure occupy a total requirement of 1,587,470 bits. This example is directed to the use of many field programmable gate arrays (FPGAs) to build the KCNN system at a lower cost of less than $50 per target device. In addition, performance becomes a factor for faster or slower devices. On average, in hardware one access to LUT-241K takes 13.25 nanoseconds for processing at the rate of 1.8 BB KCNs per second, which is about 1,600 times faster than in software.

Detailed descriptions of the drawings follow.

Figure 4:
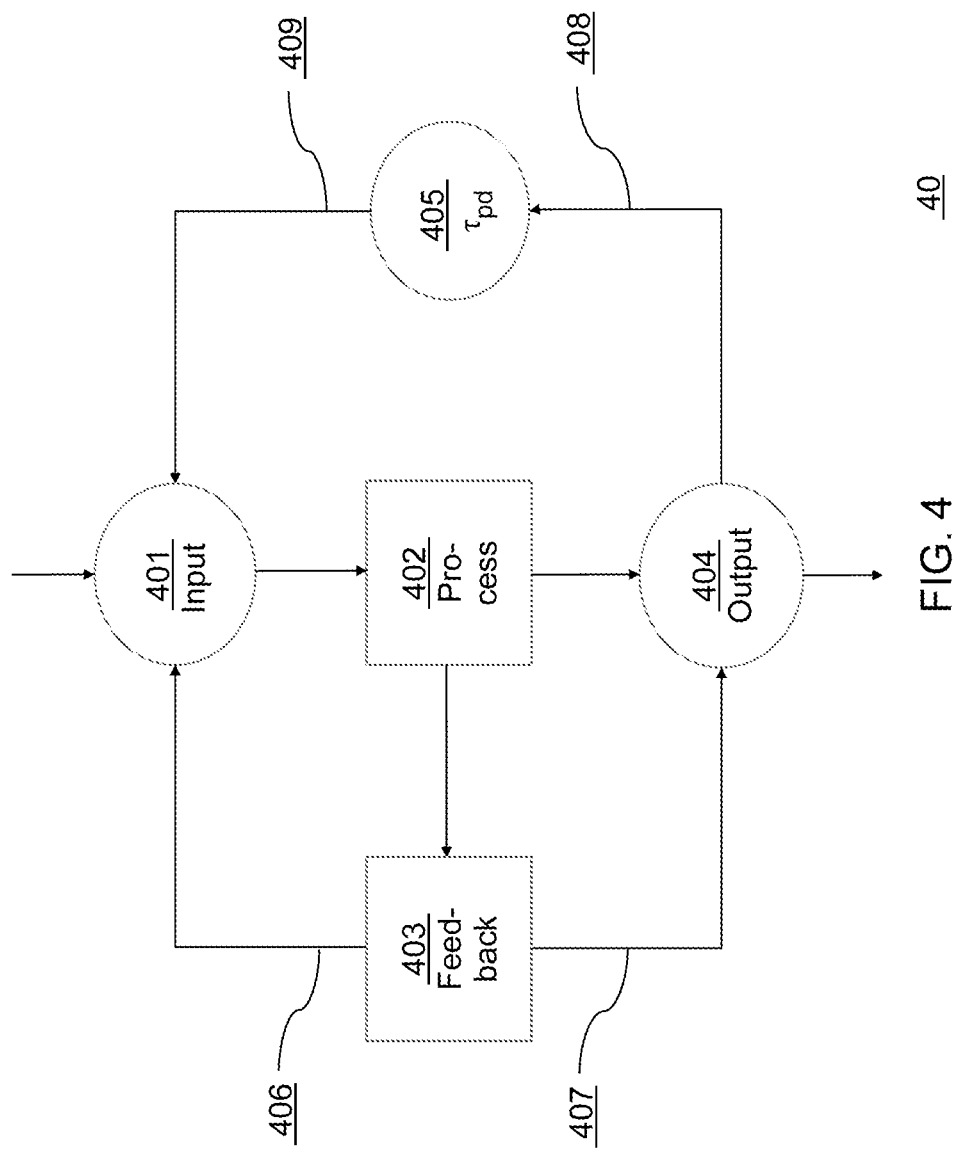
FIG. 4 illustrates the synchronous KC with feedback loops for external clock timing, named τ-propagation delays (lower-case tau) according to an embodiment of the invention.

FIG. 4 illustrates the synchronous KC with feedback loops for external clock timing, named π-propagation delays (lower-case tau).

Referring now to FIG. 4, there is illustrated a KC system 40 with feedback loops, according to an exemplary embodiment. Steps 401 and 404 are the respective input and output places. Step 402 is a process transition. Step 403 is a feedback transition. Step 405 is a tau-propagation place, such as an external clock. Step 406 is an untimed feedback path from 403 to 401. Step 407 is a process path from 403 to 404. Step 408 is a feedback path from 404 to 405. Step 409 is a continuation of the feedback path of 404 to 401 from 405 to 401. The two feedback paths are 406 and 408/409. Feedback path 406 is synchronous in that it is controlled by logical result from 403 to route data that is timing delay based on a decision, but not by a synchronous timing delay. Feedback path 408/409 is synchronous in that it is controlled by a propagation delay in 405.

Figure 5:
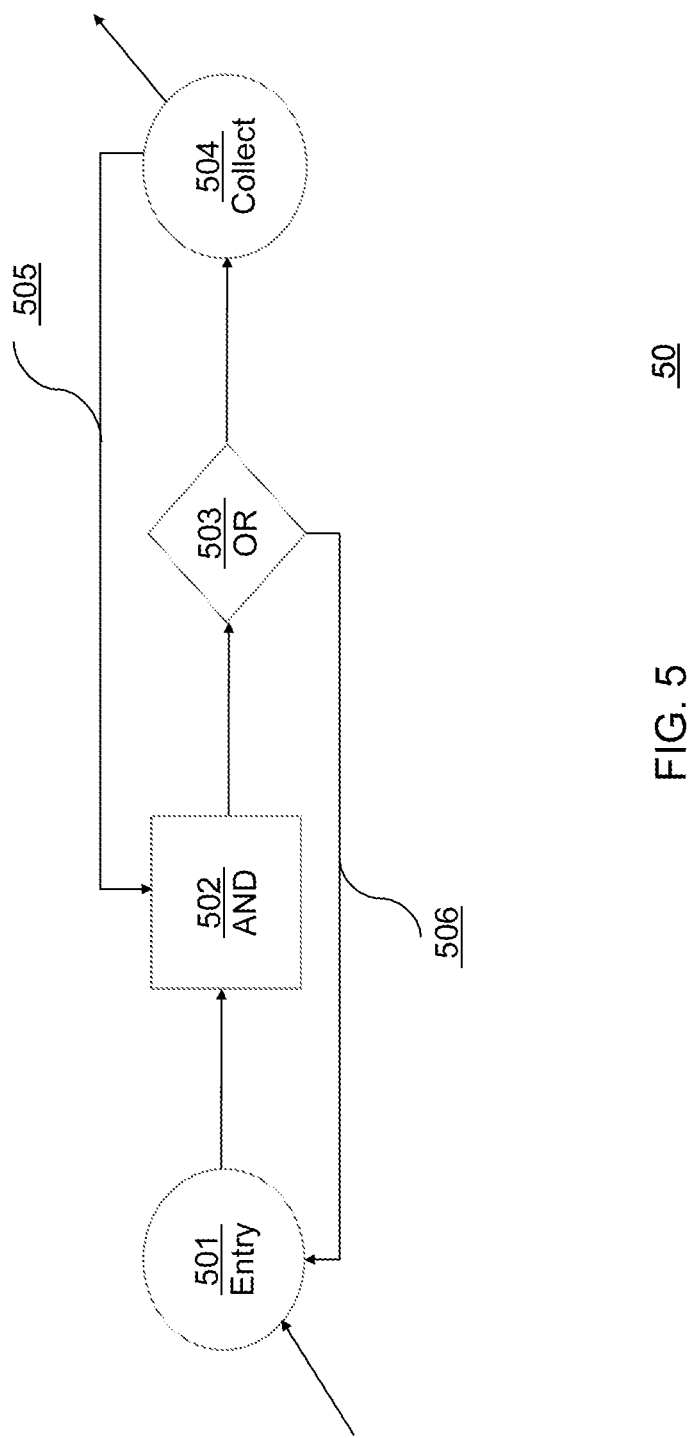
FIG. 5 illustrates a logical circuit for the KC that consists of multiple inputs, one output, and synchronous feedback loops according to an embodiment of the invention.

FIG. 5 illustrates a logical circuit for the KC that consists of multiple inputs, one output, and synchronous feedback loops.

In FIG. 5, system 50 is a logical circuit for the KC. Steps 501 and 504 are the respective input and output places, also named entry and collect nodes. Step 502 is a circuit for the logical connective of AND with the meaning of arithmetical multiplication. Step 503 is a circuit for the logical connective of OR with the meaning of arithmetical addition. The synchronous feedback paths are 506 from 503 to 501 and 505 from 504 to 502.

KC system 50 has feedback loops. Steps 505 and 506 represent back propagating paths, respectively analogous to 405 and 406 in FIG. 4. Exactly how these feedback paths are stimulated is a matter of sequencing, either by decision based on data, by external clock, or by both. This means system 50 is ultimately synchronous, and not asynchronous.

Figure 6:
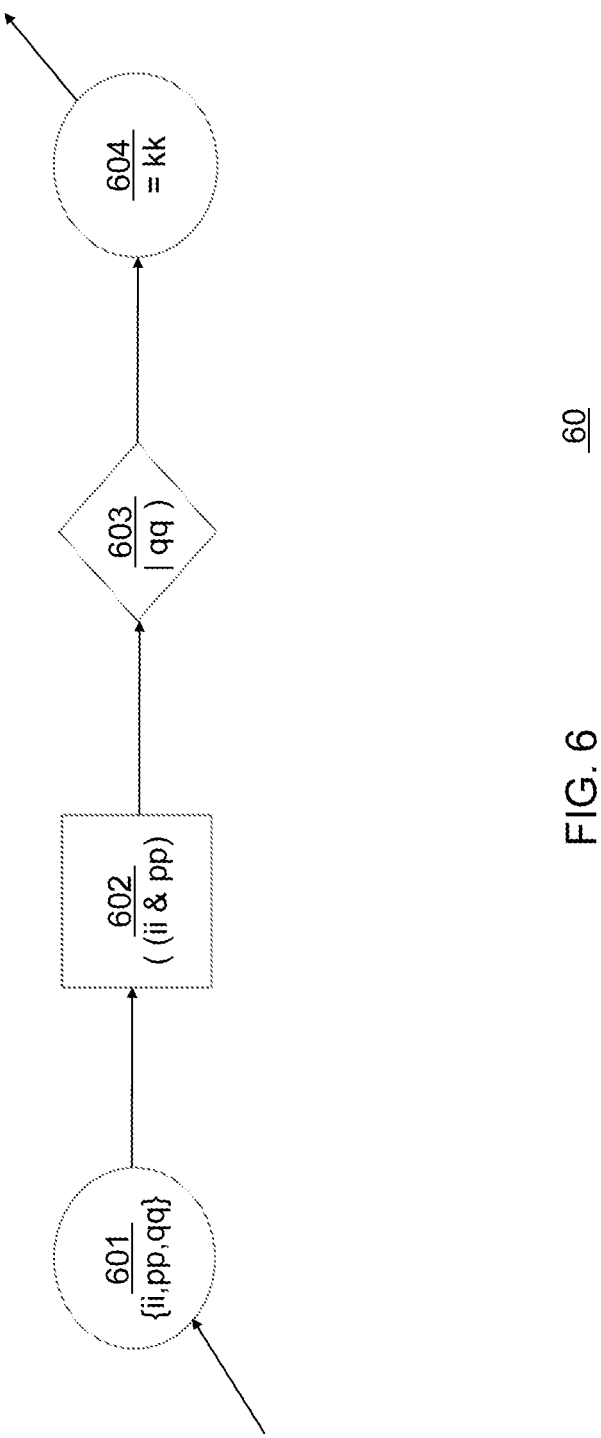
FIG. 6 illustrates a functional process diagram of the KC using symbols for nodes and processes according to an embodiment of the invention.

FIG. 6 illustrates a functional process diagram of the KC using symbols for nodes and processes according to an embodiment of the invention.

In FIG. 6, system 60 is a diagram of the KCN. Steps 601 and 604 are the respective input and output places. Step 602 is a circuit for the logical connective of AND. Step 603 is a circuit for the logical connective of OR.

KC system 60 includes two logical connective gates, an AND gate 602 and an OR gate 603. The signals specified to be processed are the set {ii, pp, qq} in 601 where ii AND pp is processed in 602, and that result is OR qq in 603 to produce the result renamed as kk in 604. Note that KC system 60 is a simplification of KC System 50 in that KC system 60 shows no feedback loops connecting from 603 to 601 or from 604 to 602, as is the case in KC system 50 from 503 to 501 and from 504 to 502. There are no feedback paths present. This means that system 60 is asynchronous or untimed by its data and with straight through data flow.

System 60 is made further unique by the method to terminate the input of signals to 601. If kk in 604 is determined to be equal to ii from 601, then this instance of system 60 stops processing. This feature inhibits system 60 from the otherwise potentially endless processing of results kk to 604. This method effectively makes system 60 into a self-timing KCN where the input ii of 601 and the output kk of 604 determine the next state of system 60 as active or dormant. This unique feature means that the KCN in system 60 is immune to external timing constraints and is wholly self-reliant for control of its asynchronous operation on its input and output data.

Figure 7:
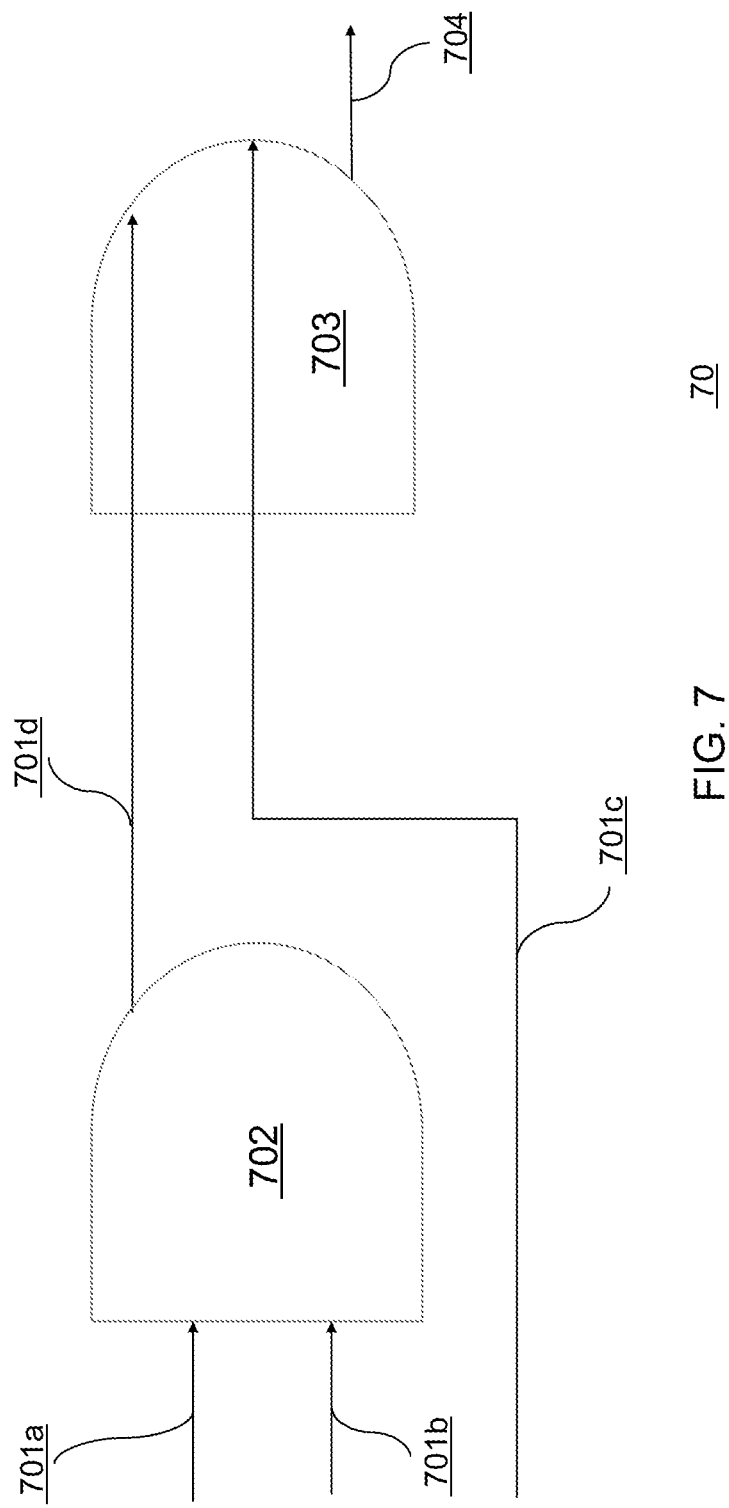
FIG. 7 illustrates an electrical diagram of the KC using symbols of Deutsches Institut für Normung (DIN) according to an embodiment of the invention.

FIG. 7 illustrates an electrical diagram of the KC using symbols of Deutsches Institut für Normung (DIN) according to an embodiment of the invention.

In FIG. 7, system 70 is an electrical diagram of the KCN using symbols of Deutsches Institut für Normung (DIN). Inputs of 701a, 701b, and 701c are processed to the output result of 704. The AND circuit is 702. The OR circuit is 703. Inputs 701a and 701b are processed in the circuit 702. Along with input 701c, the intermediate result of 701d is input into the circuit 703 and processed. The result is output as 704.

KCN system 70 illustrates the electrical embodiment of the logical diagram in KC system 70. The numbered labels therein are keyed in the last digits to the respective labels in KC system 60. The results from gate 702 as 701d and gate 703 as 704 may be determined by binary arithmetic (using the logical connectives of AND and OR) or by LUT result based on the inputs 701a, 701b, and 701c, and in either method to produce the result 704. It is the unique feature of system 70 that results are obtained directly by arithmetic computation or indirectly by LUT access. In the case of computation, there is no memory overhead for the size of a LUT. In the case of LUT access, there is no computational overhead for arithmetic. Therefore, system 70 is a generic embodiment of the KCN for faster computation-less or slower memory-less requirements.

Figure 8:
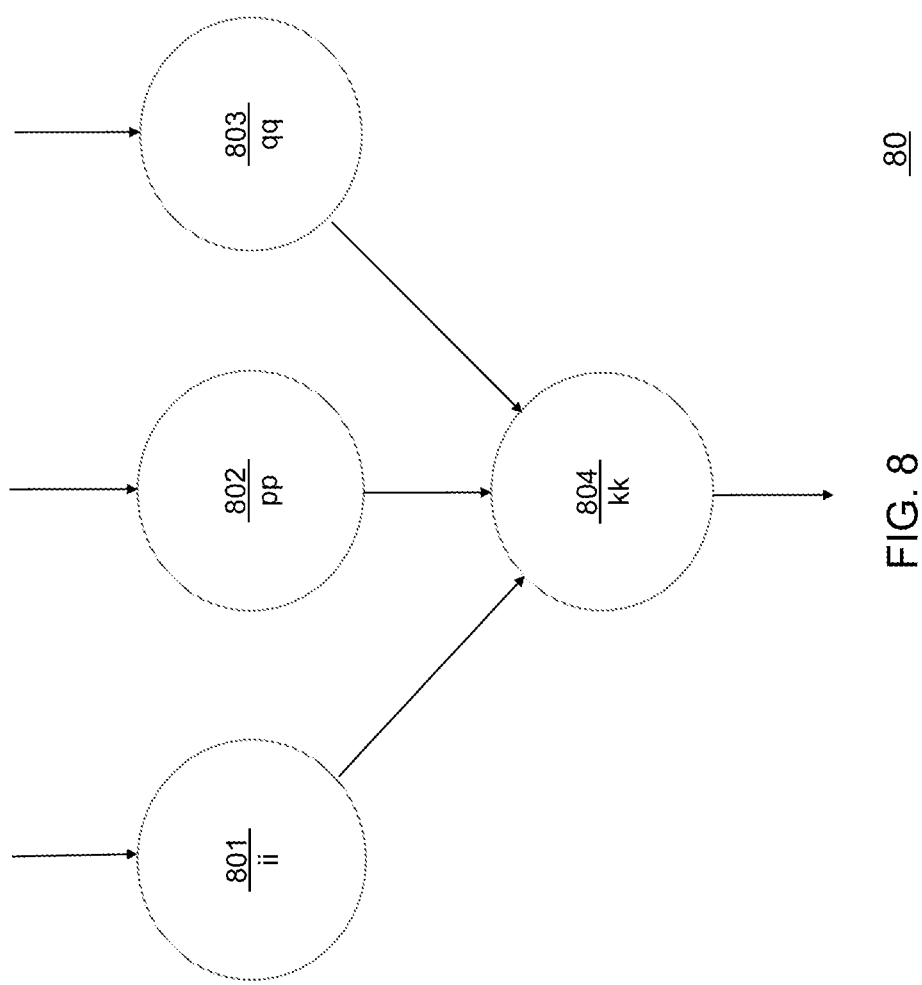
FIG. 8 illustrates a flow diagram of the KCN using symbols for nodes according to an embodiment of the invention.

FIG. 8 illustrates a flow diagram of the KCN using symbols for nodes according to an embodiment of the invention.

In FIG. 8, system 80 is an inverted ternary or 3-ary tree as a network diagram of the KCN with three inputs into one output, known as 3-to-1 processing. From previous operations, the respective kk results are in 801, 802, and 803. These serve as the subsequent inputs of ii, pp, and qq into 804 as a kk result. That in turn serves as an input to the next subsequent operations if any.

FIG. 8 maps the paths of signals named as nodes in a network tree for the embodiment of the KCN in system 80. The input nodes are for ii in 801, pp in 802, and qq in 803, and serve as three inputs in system 80 to produce one output for kk in 804. The signal values at any labeled location are automatically stored therein as data which is persistent for the duration of the electrical life of system 80 or until reassigned or erased.

Figure 9A:
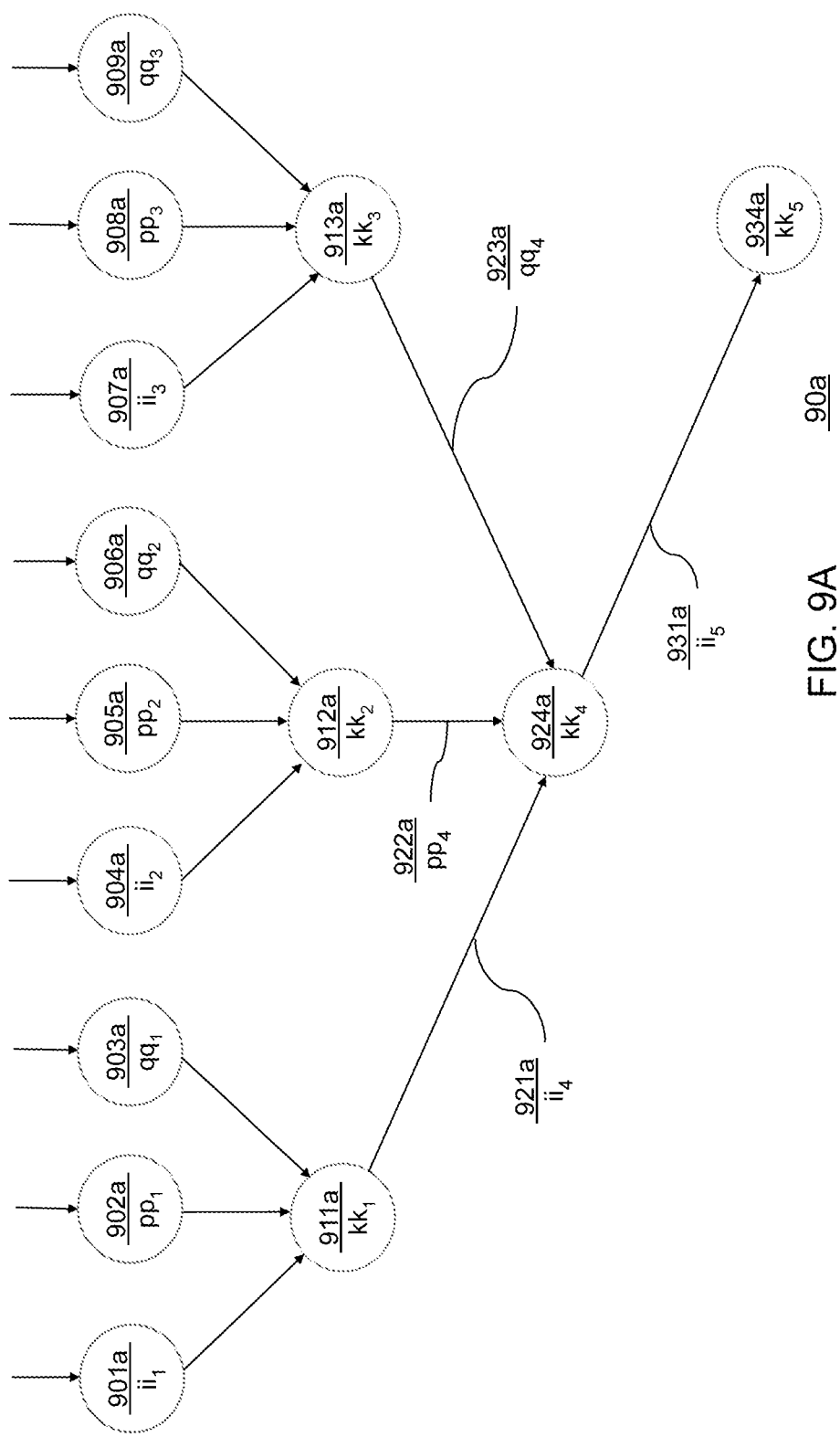
FIG. 9a illustrates a flow diagram of the KCNN with two cascading levels of KCNs using symbols for nodes according to an embodiment of the invention.

FIG. 9a illustrates a flow diagram of the KCNN with two cascading levels of KCN using symbols for nodes according to an embodiment of the invention.

In FIG. 9a, system 90a diagrams an exemplary KCNN that implements the KCN as nine inputs into one output, and named as 9-to-1 processing. Inputs 901a, 902a, and 903a result in 911a. Inputs 904a, 905a, and 906a result in 912a. Inputs 907a, 908a, and 909a result in 913a. Results 911a, 912a, and 913a are renamed respectively as 921a, 922a, and 923a. The input set of {901a, . . . , 909a} is a set of 9-values that produce 924a as a single output result. The result of 924a is renamed to 931a as one of three prospective inputs to the result in 934a.

FIG. 9a maps a plurality of the paths of signals named as nodes in a network tree for the embodiment of the KCN in system 80 above into the KCNN in system 90a. A unique feature is how consecutive outputs of kk in the set {$kk_n$, $kk_{n+1}$, $kk_{+2}$} serve as inputs of the set {$ii_{n+3}$, $pp_{n+3}$, $qq_{n+3}$} to produce $kk_{n+3}$. This method effectively passes results from one level of the nodes in a network tree into the next level of the nodes in the cascade of the nodes in a network tree. This mechanism is inherently combined with the method from [0053] above where individual KCNs become dormant when input ii is equal to output kk, to make the KCNN of system 90a terminate when signals are exhausted. For example, if $ii_1$ in 901a is equal to $kk_1$ in 911a, then $ii_4$ in 921a is null, not set to $kk_1$ of 911a, and 911a terminates that KCN. This means that, for a cascade of network paths to proceed, it requires no interruptions in the consecutive sequence of valid input values. Therefore if $kk_1$ in 911a is null, then any subsequent output value, such as $kk_4$ in 924a and $kk_5$ in 934a are null paths and no longer active. What follows from this is that $kk_2$ in 912a and $kk_3$ in 913a are also ignored by system 90a, and the next set of input signals, beginning with the unattached potential node 9nn, are potentially processed.

Figure 9B:
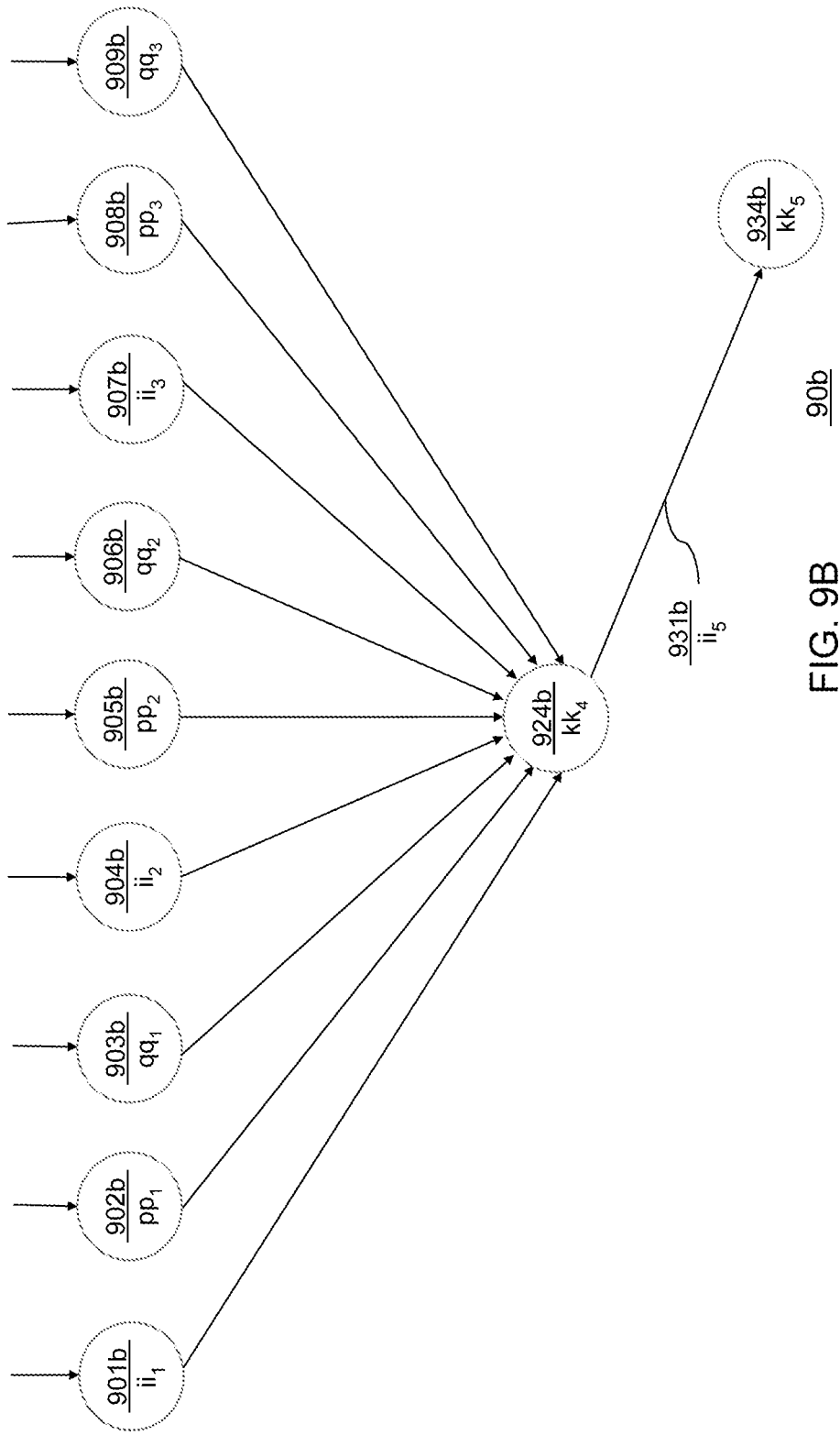
FIG. 9b illustrates a flow diagram of the KCNN with one input level of KCs using symbols for nodes according to an embodiment of the invention.

FIG. 9b illustrates a flow diagram of the KCNN with one input level of KCs according to an embodiment of the invention.

In FIG. 9b, system 90b diagrams an exemplary KCNN that implements as nine inputs into one output, a 9-to-1 processing, as a one step process. Inputs 901b-909b result in 924b. The result of 924b is renamed to 931b as one of three prospective inputs to the result in 935b.

System 90a markedly contrasts with system 90b. System 90a contains three 3-to-1 inputs KCs 911a-913a where the output of each of these KCs is processed by another KC 924a. System 90b contains the 9-to-1 inputs that is processed by 924b. Effectively, system 90b contains two cascading levels of KCs where 924b performs the processing of KCs 911a-913a and 924a.

In a preferred implementation, system 90b may be implemented using a LUT. The LUT has is pre-fill with calculated results for output 924a from the nine inputs 901a-909a according to Equation (2). The LUT has the essential and special property that when the input and output are not identical (ii≠kk), the result is valid; however, when the input and output are identical (ii=kk), then the result is invalid. This property effectively limits the input and terminates the output of the KCNN. As such, about 93% of input signals would be rejected as invalid, and about 7% of input signals would be accepted as valid. The large proportion of possible invalid results allows for techniques to quickly filter out the invalid results during processing. Also, when the output KCNN is used as an input to a next level of KCNN, invalid results from the KCNN can be filtered out without processing the next level of KCNN. Further, a LUT table with this property is sparsely-filled and may be implemented in an efficient manner as known to one of ordinary skill in the art. An output result is obtained at the previous step or iteration to the termination of the process, at any point within a chain or cascade of the KCNN.

One distinguishing feature of the method of FIG. 9b is that if all input and output signals are acceptable and not null, then the output result of $kk_4$ in 931 may be obtained directly by one access to a LUT as indexed by the nine input signals in the set $\{ii_1, pp_1, qq_1, ii_2, pp_2, qq_2, ii_3, pp_3, qq_3\}$. In other words, system 90 is based on nine-input signals to one-output signal as in the ratio of (3^2) to 1 or 9:1. It is this embodiment of system 90 that performs most quickly, and hence is ideally suited for implementation in hardware over software. System 90 may be programmed to perform one or more of the processes of the described exemplary embodiments.

Further, in other embodiments of the invention, two or more cascading levels of the KCN systems may be implemented and scaled similarly to the two cascaded levels of KCs as in system 90b. In some implementations, these systems may be implemented using a LUT. The flexibility and scalability of these systems add to the robustness of embodiments of the invention for a number of applications. When the quantity of discrete inputs are scaled upwardly, the size of the LUT also expands and at an exponential rate. As performance increases for memory and computing technology in the art, the size of the LUTs for KCNNs may also be viably increased for a specific application. Because such enormous LUTs remain as sparsely populated, compression techniques may also be invoked to collapse, stack, overlay, overwrite, and self-modify LUTs into different smaller spaces.

Figure 10:
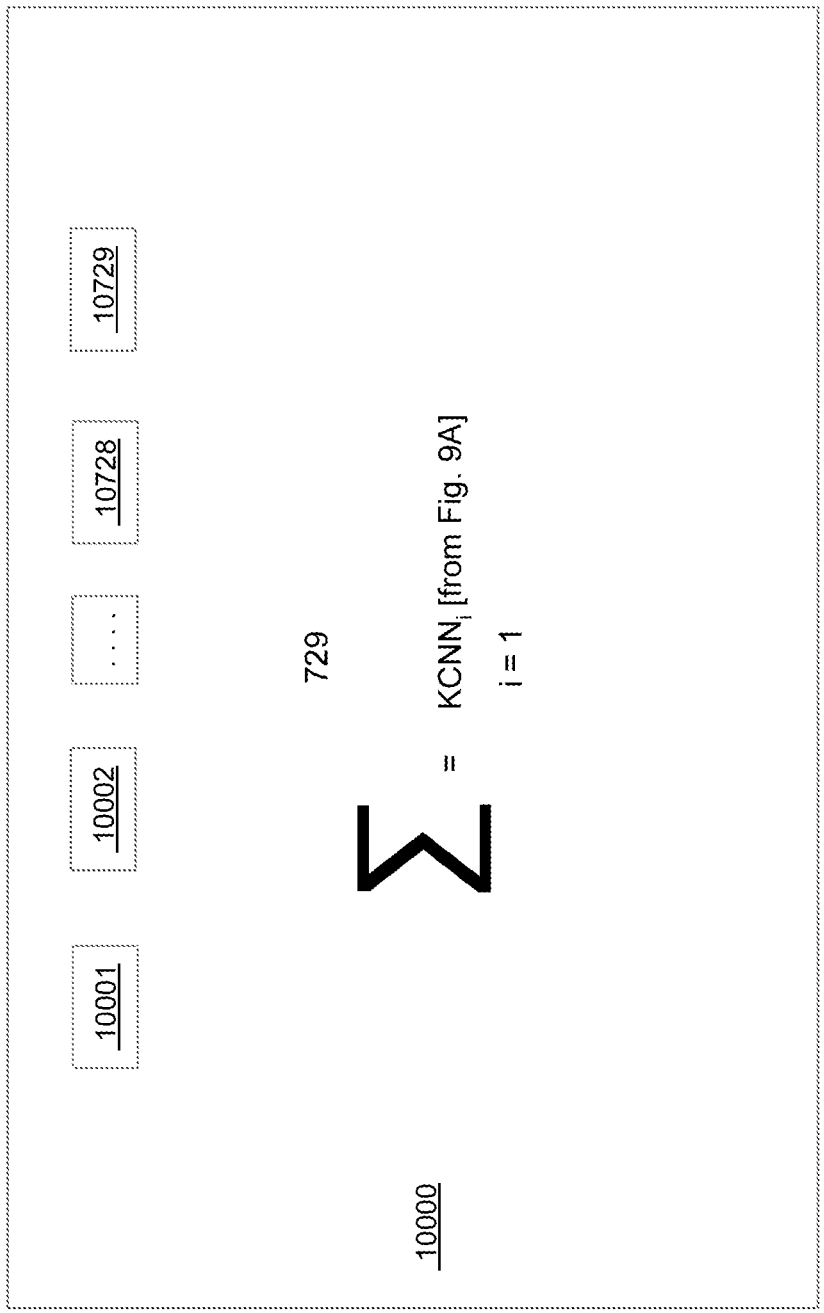
FIG. 10 illustrates a system level diagram of a plurality of KCNNs using blocks for individual KCNNs according to an embodiment of the invention.

FIG. 10 illustrates a system level diagram of a plurality of KCNNs using blocks for individual KCNNs according to an embodiment of the invention.

In FIG. 10, system 100 is a diagram of a plurality of KCNNs. There are 729 constituent KCNs named 10001, 10002, . . . , 10728, 10729. The total number of KCNNs is calculated by the summation formula named 10000 and read as the sum of KCNNs from 1 to 729.

FIG. 10 is an example of KCNNs mapping many biological neuron cells in system 100. Here about 94 billion KCNs (3^23 KCNs) are mapped by 729 KCNNs of the inclusive range of [10001, 10729]. This example is based on the limitation that the largest natural number of indexes to a LUT, as easily represented in 32-bit computing machinery, is about 2^32. That in turn limits the number of KCNs processed per KCNN with a LUT of 524,288 bits (65,536 bytes or 64 KB) to 21,523,361 KCNs per KCNN, as determined by the running sum of (3^(i−2)) for i from 1 to 17. If a complex programmable logic device (CPLD) or a FPGA contains about 3^17 KCNs, then such devices as KCNNs arranged in parallel sequence may easily map and quickly process large numbers of corresponding biological neuron cells. Hence system 100 represents the digital framework for processing about 94 billion biological neuron cells. System 100 may be assembled and programmed into a serial or parallel cascade as a computer system of KCNNs to perform one or more of the processes of the described exemplary embodiments.

In FIG. 10, a unique feature of the KCNN is that random input of 129 million signals (3^17) results in values for 43 million KCNs (3^16), but a single subsequent result value produced at the next lower level of 3^15 KCNs is infrequent at the rate of about 1.2%, from 10,000 tests of such random input to that KCNN. This means that the KCNN as implemented in the source code in True BASIC® below performs effectively as a two level network, or a tree of depth-2, after the non null input is randomly submitted in test.

Figure 11:
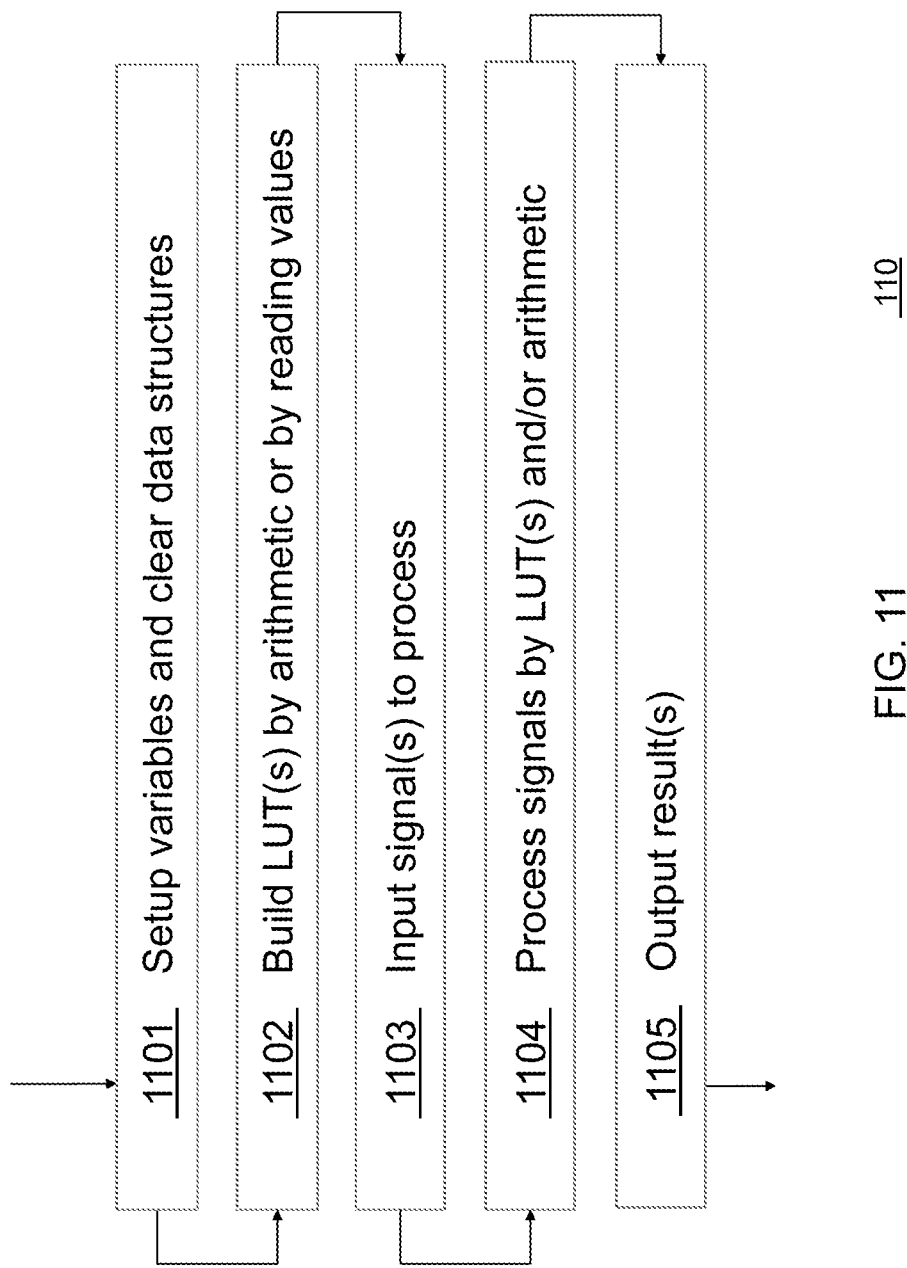
FIG. 11 illustrates a behavioral diagram of the KCNN using symbols for blocks of computer programming tasks according to an embodiment of the invention.

FIG. 11 illustrates a behavioral diagram of the KCNN using symbols for blocks of computer programming tasks according to an embodiment of the invention.

In FIG. 11, system 110 is the data flow diagram in software and hardware of the KCNN. In 1101, data structures and variables are initialized. In 1102, LUT(s) are built by arithmetic from primitives or by reading from a constant list of predetermined values. In 1103, signals to process are input. In 1104, results from input values are processed by LUT, by arithmetical calculation, or by both. The results from 1104 are output in 1105.

FIG. 11 contains the flow chart steps to program KCNNs in system 110. Of unique interest is the method to build LUTs in 1102. Results may be obtained by logical arithmetic, or LUTs may be constructed by either logical arithmetic or by reading data directly from a specification list, or a combination of both. However the size or extent of the LUT may be limited by the number and type of datum. The MVL chosen for exposition here, and not to be construed as a limitation, is 4VL or a 4vbc where the values are in the set $\{00, 01, 10, 11\}$ and taken to express respectively in words the logical states of {contradiction, true, false, tautology} and the decimal digits of $\{0, 1, 2, 3\}$. A fifth value of null or " " is helpful for ease in programming.

Of unique interest to the method of system 110 is the rationale behind folding the 2-tuple "00" into null " ". Contradiction or "00" means "not false and not true" or in other words "true and false" as absurdum. Null on the other hand has the meaning of nothing or no value. Because absurdum imparts no information about the state of true (01), false (10), or tautology as "false or true" (11), then the informational value of absurdum is as void as to the state of falsifiability as is null. Hence the 4VL adopted in this exposition is the set {" ", "01," "10," "11"}. This means that the whenever an input signal of "00" or " " is encountered, it short circuits and voids that KCN processing it.

The methodology for building the LUT for three inputs to one output is disclosed further and taught here. For the three input variables as in the set of {ii, pp, qq}, each variable of which is a 2-tuple as in the set of {" ", "01", "10", "11"}, there are 2^6 or 64-combinations possible, and typically indexed as in the inclusive interval range of [0, 63]. Of these 64-combinations, there are 14-combinations that do not include the value " ", as presented in Table 1 for the 14-combinations excluding " ".

TABLE 1

| Connective No. | ((ii | & pp) | \|qq) | =kk |
|---|---|---|---|---|
| 090 | 01 | 01 | 10 | 11 |
| 095 | 01 | 01 | 11 | 11 |
| 106 | 01 | 10 | 10 | 10 |
| 111 | 01 | 10 | 11 | 11 |
| 122 | 01 | 11 | 10 | 11 |
| 127 | 01 | 11 | 11 | 11 |
| 149 | 10 | 01 | 01 | 01 |
| 159 | 10 | 01 | 11 | 11 |
| 165 | 10 | 10 | 01 | 11 |
| 175 | 10 | 10 | 11 | 11 |
| 181 | 10 | 11 | 01 | 11 |
| 191 | 10 | 11 | 11 | 11 |
| 213 | 11 | 01 | 01 | 01 |
| 234 | 11 | 10 | 10 | 10 |

The connective number is the decimal equivalent of the binary digits. For example, binary "11 10 10 10", with most significant on the left, is decimal 234. The connective number is meaningful as an identifier in the mathematical theory of 4vbc. When the 14-combinations of Table 1 are placed in the LUT of 64-entries, the frequency of distribution is sparse as indicated in the four DATA statements of the source code in True BASIC®.

The methodology for building the LUT for nine inputs to one output is disclosed and taught here. Three instances of the table of 64-elements are manipulated to produce all possible combinations. Each combination of three inputs and one output is further checked for the exclusive condition of ii=kk for which that combination is subsequently excluded as null " ". The resulting LUT consists of 64^3 or 262,144 entries, each of which is a 2-tuple, that is, the LUT is indexed by 18-bits or 2^18 entries. In the source code in True BASIC®, this LUT is populated by manipulation of input arrays. In the source code in VHDL, this LUT is enumerated bit-by-bit and occupies over 300-pages of text as elided in the line CONSTANT lut: bit_lut:=(("00"), . . . ("00")).

This instant LUT for nine inputs to one output contains the values of kk from Table 1 above (indexed base-256), but is rather distributed over a base-64 index, excluding " ", as presented in Table 2.

TABLE 2

| Idx | 22 | 23 | 26 | 27 | 30 | 31 | 37 | 39 | 41 | 43 | 45 | 47 | 53 | 58 |
|---|---|---|---|---|---|---|---|---|---|---|---|---|---|---|
| kk | 11 | 11 | 10 | 11 | 11 | 11 | 01 | 11 | 11 | 11 | 11 | 11 | 01 | 10 |

In Table 2 the 18-bits representing the decimal index values for range of [0, 262143] contain that recurring pattern of kk results in the least significant index digits. This constitutes a new algorithmic theory of learning named the Kanban Cell Neuron Learning Model (KCNLM) for the following reasons. Table 2 satisfies Occam's Razor for presentation of information in its most compact, minimal distance length (MDL). Table 2 also produces results that are deterministic, not probabilistic, and satisfy the requirement to be testable, verifiable, and reproducible. How the 18-bits of nine 2-tuple, in groups of three 2-tuple or otherwise, are assigned is determined by a practitioner in the art. For example, the statement "The King of France is bald, and snow in Hong Kong is falling" may be assigned by a practitioner into two groups of three 2-tuple as 12-bits to yield an equivalent result of 00, contradiction, or absurdum, as follows. The King of France ($ii_1$=11 tautology, because French history has kings) is ($pp_1$=00, because the head of state is now elected, rendering kingship moot) bald ($qq_1$=00, because bald kingship is similarly moot), with $kk_1$=00 absurdum, AND snow ($ii_2$=11) in Hong Kong ($pp_2$=10 false, because snow is unknown there) is falling ($qq_2$=00, because snow is not possible there), with $kk_2$=10 false. These combined expressions as $kk_1$ 00 AND $kk_2$ 10 reduce to 00 absurdum. Note also that if the state of affairs is expressed as the King ($ii_3$=11) was ($pp_3$=01 true) bald ($qq_3$=01), with $kk_3$=01 true, then the combined expressions as $kk_3$ 01 AND $kk_2$ 10 continue to reduce to 00 absurdum.

Based on the behavior of the KCN, an important characteristic of the KCNN follows in the contents of its LUT. For the values of {ii, pp, qq} as {11, 11, 11}, the formula of (ii & pp)|qq=kk as (11 & 11)|11=11 seems intuitive, but is actually mistaken for the KCN here. This is because whenever the condition arises of ii=kk, the KCN is in a state of termination and hence has the value of 00 or null " ". This condition is borne out and consistent with the manual decomposition and interpretation of the 18-bit input code. For example, consider the input of 01 11 11 11 00 11 01 10 10. The respective 6-bit inputs are read with intermediate results as: {11, 00, 10} to produce correctly 10; and not {11, 11, 10} to produce mistakenly 11.

Because of the condition if ii=kk then kk=" " or 00, the values in Table 2 may be shortened in some cases to include only the indexes of 26, 37, 53, and 58, which are in brackets in Table 3. For example, with the powers of 64 as {31, 31, 27}, the blocked 18-bit input of 01 11 11 01 11 11 01 10 11 produces {ii, pp, qq}=kk as {11, 11, 11}=11, where ii=kk, so the result changes as kk=" " or 00. In contrast with the powers of 64 as {32, 31, 27}, the binary input of 10 00 00 01 11 11 01 10 11 produces {ii, pp, qq}=kk as {00, 11, 11}=11, where ii≠kk, so the result remains the same as kk=11.

TABLE 3

| Idx | 22 | 23 | [26] | 27 | 30 | 31 | [37] | 39 | 41 | 43 | 45 | 47 | [53] | [58] |
|-----|----|----|------|----|----|----|------|----|----|----|----|----|------|------|
| kk  | 11 | 11 | [10] | 11 | 11 | 11 | [01] | 11 | 11 | 11 | 11 | 11 | [01] | [10] |

A further exposition of the attributes in Table 1 is when these 14 expressions are mapped into predicate logic, they prove that time is bivalent.

LET ii, qq=01 present, 10 past, 11 future; pp=01 verifies, 10 falsifies, 11 proves; kk=01 true, 10 false, 11 proof (The three digit ordinals refer to expressions in a bivalent logical system.):

| | |
|---|---|
| 090 | 01 01 10 = 11; Present verifies past. |
| 095 | 01 01 11 = 11; Present verifies future. |
| 106 | 01 10 10 = 10; "Present falsifies past" is false; hence, Present verifies past. |
| 111 | 01 10 11 = 11; Present falsifies future. |
| 122 | 01 11 10 = 11; Present proves past; |
| | i.e., Present verifies past OR Present falsifies past: |
| | [090] 01 01 10 = 11 OR [106] 01 10 10 = 10 == 01 11 10 = 11 |
| 127 | 01 11 11 = 11; Present proves future; |
| | i.e., Present verifies future OR Present falsifies future: |
| | [095] 01 01 11 = 11 OR [111] 01 10 11 = 11 == 01 11 11 = 11 |
| 149 | 10 01 01 = 01; "Past verifies present" is true. |
| 159 | 10 01 11 = 11; Past verifies future. |
| 165 | 10 10 01 = 11; Past falsifies present. |
| 175 | 10 10 11 = 11; Past falsifies future. |
| 181 | 10 11 01 = 11; Past proves present; |
| | i.e., Past verifies present OR Past falsifies present: |
| | [149] 10 01 01 = 01 OR [165] 10 10 01 = 11 == 10 11 01 = 11 |
| 191 | 10 11 11 = 11; Past proves future; |
| | i.e., Past verifies future OR Past falsifies future: |
| | [159] 10 01 11 = 11 OR [175] 10 10 11 = 11 == 10 11 11 = 11 |
| 213 | 11 01 01 = 01; "Future verifies present" is true. |
| 234 | 11 10 10 = 10; "Future falsifies past" is false; hence, Future verifies past. |

What follows is that time being bivalent (a group, ring, and module) is not a vector space, and hence cannot be a dimension by that definition. This implies: a Cartesian universe of three dimensions only; that time was, just "is", and always will be; that time is everywhere; and that time cannot be escaped. That measured time slows during high speed travel in space, relative to that of a fiducial point in a gravity well, is compatible with time as bivalent.

The KCNN as a two-level network processes random input into a single value in about 1.2% of all results. Table 4 presents examples of the four possible result values, in 2-tuple and in ordinal formats.

TABLE 4

| | pp | qq | kk | |
|---|---|---|---|---|
| Tuple: ii | | | | |
| | 11 11 10 | 11 11 11 | 11 01 01 | 01 |
| | 11 11 11 | 11 11 11 | 11 10 10 | 10 |
| | 11 10 01 | 11 01 11 | 01 11 11 | 11 |
| | 11 11 11 | 11 11 11 | 11 11 11 | 00, "", null |

TABLE 4-continued

| | pp | qq | kk | |
|---|---|---|---|---|
| Ordinal: ii | | | | |
| | 3 3 2 | 3 3 3 | 3 1 1 | 1 |
| | 3 3 3 | 3 3 3 | 3 2 2 | 2 |
| | 3 2 1 | 3 1 3 | 1 3 3 | 3 |
| | 3 3 3 | 3 3 3 | 3 3 3 | 0, "", null |

Table 4 reiterates the feature that KCNNs favor the collective processing of tautologies because out of the 40 tuple values, 29 are tautologies (70%).

Although the exemplary embodiments are described herein, the present invention is applicable to machine cognition, as will be appreciated by those skilled in the art(s).

Further, systems described can include at least one computer readable medium or memory for holding instructions programmed according to the teachings of the invention and for containing data structures, tables, records, or other data described herein. Common forms of computer-readable media can include, for example, a floppy disk, a flexible disk, hard disk, memory disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to one or more network. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

While the present invention was described in connection with a number of exemplary embodiments and implementations, the present invention is not so limited but rather covers various modifications and equivalent arrangements, which fall within the purview of the appended claims.

Source code in True BASIC® is disclosed here.

```
!    ------------------------
!
!    True BASIC Simulation of KCNN
!
!    Copyright 2012 Colin James III All rights reserved.
!
!    ------------------------
!
!    Declare global variables
!
CALL Declare_global_variables
!    ------------------------
!    Set up and clear arrays
!
CALL Setup_clear_arrays
!    ------------------------
!    Load look up tables (LUTs)
!
CALL Load_LUTs
!    ------------------------
!    KCN experiment
!
CALL KCN_n_experiment
!    ------------------------
!    Data to load LUT
!
!    This is the 14-valid results embedded within the total of 64-elements
!
!    Rank 0 1 2 3 4 5 6 7 8 9 10 11 12 13 14 15
     DATA "","","","","","","","","","","","","","","",""
!    Rank 16 17 18 19 20 21 22 23 24 25 26 27 28 29 30 31
     DATA "","","","","","","","","3","3","","","2","3","","","3","3"
!    Rank 32 33 34 35 36 37 38 39 40 41 42 43 44 45 46 47
     DATA "","","","","","","1","","3","","","3","","3","","3","","3"
!    Rank 48 49 50 51 52 53 54 55 56 57 58 59 60 61 62 63
     DATA "","","","","","1","","","","","","2","","","","",""
!    ------------------------
!    Subroutine section
!
SUB Declare_global_variables
       LET min_4vbc       = 0                        ! "00"
       LET max_4vbc       = 3                        ! "11"
       LET kcn_default$   = ""
       LET max_kcn_pwr    = 18                       ! <<<<<<< This is the n of KCN ^ n
       LET max_kcn_idx    = 3 ^ ( max_kcn_pwr – 1)
       LET _pwr_defaultn  = – 1
END SUB                                              ! Declare_global_variables
SUB Setup_clear_arrays
       OPTION BASE 0
       DIM           kcn$( 0)
       MAT REDIM     kcn$( max_kcn_idx)              ! kcn$( 3 ^ ( max_kcn_pwr – 1) – 1)
       MAT           kcn$ = kcn_default$
       DIM           lut2$( 0)
       MAT REDIM     lut2$( 262143)
       MAT           lut2$ = kcn_default$
       DIM           p4$( 0, 0, 0)
       MAT REDIM     p4$( 63, 63, 63)
       MAT           p4$ = kcn_default$
       DIM           lutr2$( 0)
       MAT REDIM     lutr2$( 63)
       MAT           lutr2$ = kcn_default$
END SUB                                              ! Setup_clear_arrays
SUB Load_LUTs
       FOR i = 0 TO 63
              READ lutr2$( i)
       NEXT i
       FOR kc_1 = 0 TO 63
              FOR kc_2 = 0 TO 63
                     FOR kc_3 = 0 TO 63
                            LET p4$( kc_1, kc_2, kc_3) = lutr2$( kc_3)
                     NEXT kc_3
              NEXT kc_2
       NEXT kc_1
       FOR kc_1 = 0 TO 63
              LET ii$ = lutr2$( kc_1)
              FOR kc_2 = 0 TO 63
                     LET pp$ = lutr2$( kc_2)
                     FOR kc_3 = 0 TO 63
                            LET qq$ = lutr2$( kc_3)
                            LET kk$ = p4$( kc_1, kc_2, kc_3)
                            IF NOT( kk$ = "") THEN
                                   IF NOT( ii$ = kk$) THEN
```

```
                        LET cnt_okout = cnt_okout + 1
                    ELSE
                        LET p4$( kc_1, kc_2, kc_3) = "" ! removes ii$ = kk$
                        LET cnt_noout = cnt_noout + 1
                    END IF
                ELSE
                    LET cnt_noinp = cnt_noinp + 1
                END IF
                LET cnt_total = cnt_total + 1
            NEXT kc_3
        NEXT kc_2
    NEXT kc_1
    LET idx_lut = 0
    FOR ii = 0 TO 63
        FOR pp = 0 TO 63
            FOR qq = 0 TO 63
                LET test$ = p4$( ii, pp, qq)
                IF NOT( test$ = "") THEN
                    LET lut2$( idx_lut) = test$
                END IF
                LET idx_lut = idx_lut + 1
            NEXT qq
        NEXT pp
    NEXT ii
END SUB                                              ! Load_LUTs
SUB KCN_n_experiment
    LET start_rnd = Time
    LET kcn_idx      = ( 3 ^ ( max_kcn_pwr – 1)    )
    FOR random_sig_idx = ( 3 ^ ( max_kcn_pwr     ) – 1)
                                     TO ( ( 3 ^ 2) – 0) STEP –9
        LET result$ = lut2$( INT( RND * 262144))   ! parted to 9 signals
        IF NOT( result$ = "") THEN      ! else kcn$( kcn_idx) remains "" null
            LET kcn_idx = kcn_idx – 1   ! decrement kcn_idx before applying
            LET kcn$( kcn_idx) = result$
        END IF
    NEXT random_sig_idx
    FOR normal_pwr_idx = ( ( max_kcn_pwr – 1)) TO ( 2) STEP –1
        LET kcn_idx = ( 3 ^ ( normal_pwr_idx – 1)    )
        FOR sig_idx = ( 3 ^ ( normal_pwr_idx      ) – 1)
                                     TO ( ( 3 ^ 2) – 0) STEP –9
            LET t$ = kcn$( sig_idx – 8) & kcn$( sig_idx – 7) &
                     kcn$( sig_idx – 6) & kcn$( sig_idx – 5) &
                     kcn$( sig_idx – 4) & kcn$( sig_idx – 3) &
                     kcn$( sig_idx – 2) & kcn$( sig_idx – 1) &
                     kcn$( sig_idx – 0)
            IF LEN( t$) = 9 THEN
                         ! 4*(4*(4*(4*(4*(4*(4*(4*(a)+b)+c)+d)+e)+f)+g)+h)+i
                LET test_idx_2 = 4*(4*(4*(4*(4*(4*(4*(
                    VAL( t$[ 1:1])) + VAL( t$[2:2]))) + VAL( t$[ 3:3])) +
                    VAL( t$[ 4:4])) + VAL( t$[ 5:5])) + VAL( t$[ 6:6])) +
                    VAL( t$[ 7:7])) + VAL( t$[ 8:8])) + VAL( t$[ 9:9])
                LET kcn_idx = kcn_idx – 1 ! decrement before applying
                LET kcn$( kcn_idx) = lut2$( test_idx_2)
            END IF
        NEXT sig_idx
    NEXT normal_pwr_idx
END SUB                                              ! KCN_n_experiment
!  --------------------------
!   Program termination
!
END
```

Source code in VHDL is disclosed here.

```
------------------------------------------------------------------------
-- Module Name: KCNN test bench and functional
--
-- Copyright 2013 Colin James III All rights reserved.
------------------------------------------------------------------------
LIBRARY             ieee ;
    USE             ieee.std_logic_1164.ALL ;
    USE             ieee.numeric_std.ALL ;
ENTITY test_bench IS
END test_bench ;
ARCHITECTURE behavior OF test_bench IS
    COMPONENT kcnn
```

-continued

```
        PORT( clk                          : IN         std_logic;
              sig_inp_18_bits              : IN         std_logic_vector ( 17 DOWNTO 0 ) ;
              -- INOUT ok in Lattice
              sig_buf_02_bits              : BUFFER     std_logic_vector ( 1 DOWNTO 0 ) ) ;
        END COMPONENT ;
        SIGNAL clk                         : std_logic;
        SIGNAL sig_inp_18_bits             : std_logic_vector ( 17 DOWNTO 0 ) ;
        SIGNAL sig_buf_02_bits             : std_logic_vector ( 1 DOWNTO 0 ) ;
        CONSTANT period                    : time := 20 ns ;
BEGIN
    uut: kcnn             -- Check and add one's generic clause manually
    PORT MAP(       clk => clk ,
                    sig_inp_18_bits => sig_inp_18_bits ,
                    sig_buf_02_bits => sig_buf_02_bits   ) ;
    clock : PROCESS         -- Process to control the clock
    BEGIN
                    clk <= '1' ;
                    WAIT FOR PERIOD / 2 ;
                    clk <= '0' ;
                    WAIT FOR PERIOD / 2 ;
    END PROCESS ; -- clock
    tb : PROCESS       -- * * * Test Bench - User Defined Section * * *
    BEGIN
                    sig_inp_18_bits         <= "ZZZZZZZZZZZZZZZZZZ"   ; -- signal bit_vector,
                                                                        -- initially clear 1 of 32 inputs
                    WAIT FOR 40 ns ;
                    sig_inp_18_bits         <= "000000000000000000"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000001"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000010"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000011"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000100"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000101"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000110"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000000111"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001000"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001001"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001010"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001011"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001100"   ; -- signal bit_vector
                    WAIT FOR 40 ns ;
                    sig_inp_18_bits         <= "ZZZZZZZZZZZZZZZZZZ"   ; -- signal bit_vector
                    WAIT FOR 40 ns ;
                    sig_inp_18_bits         <= "000000000000001101"   ; -- signal bit_vector
```

```
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000001110"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000001111"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010000"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010001"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010010"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010011"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010100"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010101"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010110"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000010111"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011000"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011001"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011010"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011011"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011100"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011101"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011110"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                sig_inp_18_bits        <= "000000000000011111"     ; -- signal bit_vector
                WAIT FOR 40 ns ;
                sig_inp_18_bits        <= "ZZZZZZZZZZZZZZZZZZ"    ; -- signal bit_vector
                WAIT FOR 40 ns ;
                WAIT ; -- Wait endlessly
        END PROCESS ; -- tb * * * End Test Bench - User Defined Section * * *
END ARCHITECTURE behavior ; -- OF test_bench
LIBRARY           ieee ;
```

```
        USE             ieee.std_logic_1164.ALL ;
        USE             ieee.numeric_std.ALL ;
        USE             ieee.std_logic_unsigned.ALL ;
ENTITY kcnn IS
        PORT(           clk                          : IN        STD_LOGIC ;
                        sig_inp_18_bits              : IN        STD_LOGIC_VECTOR( 17 DOWNTO 0 ) ;
                        sig_buf_02_bits              : BUFFER    STD_LOGIC_VECTOR( 1 DOWNTO 0 ) ) ;
        END kcnn ;
ARCHITECTURE kcnn_behavior OF kcnn IS
                        SUBTYPE bits_02              IS          BIT_VECTOR ( 1 DOWNTO 0 ) ;
                        SIGNAL inp_bits_18_ff        :           STD_LOGIC_VECTOR ( 17 DOWNTO 0 )
                                                                 := "000000000000000000" ;
                                                                 -- flip flop to hold address
                        SIGNAL sig_buf_02_bits_ff    :           STD_LOGIC_VECTOR ( 1 DOWNTO 0 )
                                                                 := "00" ;
                        TYPE bits_02_lut             IS          ARRAY ( 0 TO 262143 ) OF bits_02 ;
                        CONSTANT lut                 :           bits_02_lut := -- ;
                        ( ("00"),("00"),("00"),("00"),("00"),("00"),("00"),("00"),
                          ("00"),("00"),("00"),("00"),("00"),("00"),("00"),("00"),
                          -- - - - -
                          ("00"),("00"),("00"),("00"),("00"),("01"),("00"),("00"),
                          ("00"),("00"),("10"),("00"),("00"),("00"),("00"),("00") ) ;
        BEGIN
                        do_lut : PROCESS ( clk)
                        BEGIN
                        -- On rising edges of the clock, data on the input port is
                        -- latched into inp_bits_18_ff, and data from LUT is latched out.
                                IF rising_edge ( clk ) THEN
                                        inp_bits_18_ff               <= sig_inp_18_bits ;
                                        sig_buf_02_bits              <= sig_buf_02_bits_ff ;
                                END IF ;
                        END PROCESS ; -- do_lut
                        -- Combinational LUT
                        sig_buf_02_bits_ff <=
                        to_stdlogicvector( lut ( to_integer( unsigned( inp_bits_18_ff))) ) ;
END ARCHITECTURE kcnn_behavior ; -- OF kcnn
```

What is claimed is:

1. A system for processing combinatorial logic comprising a plurality of cell units in a network structure, wherein
each cell unit comprises:
combinatorial logic for processing an AND operation between a first input and a second input; and
combinatorial logic for processing an OR operation between a result of the AND operation and a third input, wherein
an output of each cell unit comprises a result of the OR operation, wherein
the network structure comprises a cascading structure of a plurality of cell unit levels, wherein
each cell unit level comprises a plurality of cell units, wherein
each cell unit of at cell unit level is configured to receive inputs from inputs to the system or the outputs of three respective cell units of a preceding cell unit level, and wherein
the last cell unit level comprises one cell unit, the output of the system comprises the output of the one cell unit, wherein
the system is configured to terminate processing when the output of a cell unit equals the first input of the cell unit.

2. The system of claim 1, wherein the network structure comprises a cascading structure of three cell unit levels.

3. The system of claim 2, wherein an operation of the system is pre-processed using a look up table (LUT).

4. The system of claim 1, wherein an operation of the system is pre-processed using a look up table (LUT).

5. The system of claim 1, wherein the first input, the second input, and the third input each comprise a four-valued logic (4 VL) in a set comprising contradiction, true, false, and tautology of a four-valued bit code (4 vbc).

6. The system of claim 5, where the contradiction set value is folded into a null set value.

7. A Kanban cell (KC), comprising a logic gate with three input values and an output value, wherein the output value is derived by arithmetical computation using the three input values, and wherein the Kanban cell performs self-timing and terminates processing when the first of the three input values equals the output value.

8. The Kanban cell of claim 7, wherein the Kanban cell does not contain feedback loops.

9. The Kanban cell of claim 7, wherein the arithmetical computation is pre-performed to a look up table (LUT).

10. The Kanban cell of claim 7, wherein the three input values each comprises a four-valued logic (4 VL) in a set comprising contradiction, true, false, and tautology of a four-valued bit code (4 vbc).

11. The Kanban cell of claim 7, wherein the contradiction set value is folded into a null set value.

12. A Kanban cell neuron (KCN), comprising a plurality of Kanban cells (KC) of claim 7 in sequential and/or parallel operation.

13. The Kanban cell neuron of claim 12, wherein the Kanban cell neuron includes nine input values and an output value.

14. The Kanban cell neuron of claim 12, wherein the Kanban cell neuron performs self-timing and terminates processing when the first, fourth, or seventh of the nine input values equals the output value.

15. A Kanban cell neuron networking (KCNN), comprising a plurality of Kanban cell neurons of claim 12 in sequential and/or parallel operation.

16. A method of processing logic, comprising:
computing arithmetically an output value using three input values; and terminating processing when the first of the three input values equals the output value, wherein the computing is self-timing, and wherein the three input values each comprises a four-valued logic (4 VL) in a set comprising contradiction, true, false, and tautology of a four-valued bit code (4 vbc).

17. The method of claim 16, wherein the computing is pre-performed to a look up table (LUT).

18. The method of claim 16, wherein the contradiction set value is folded into a null set value.

* * * * *